July 1, 1930.　　　J. A. LUSIER　　　1,769,266
SPRAY DEVICE
Filed July 11, 1927
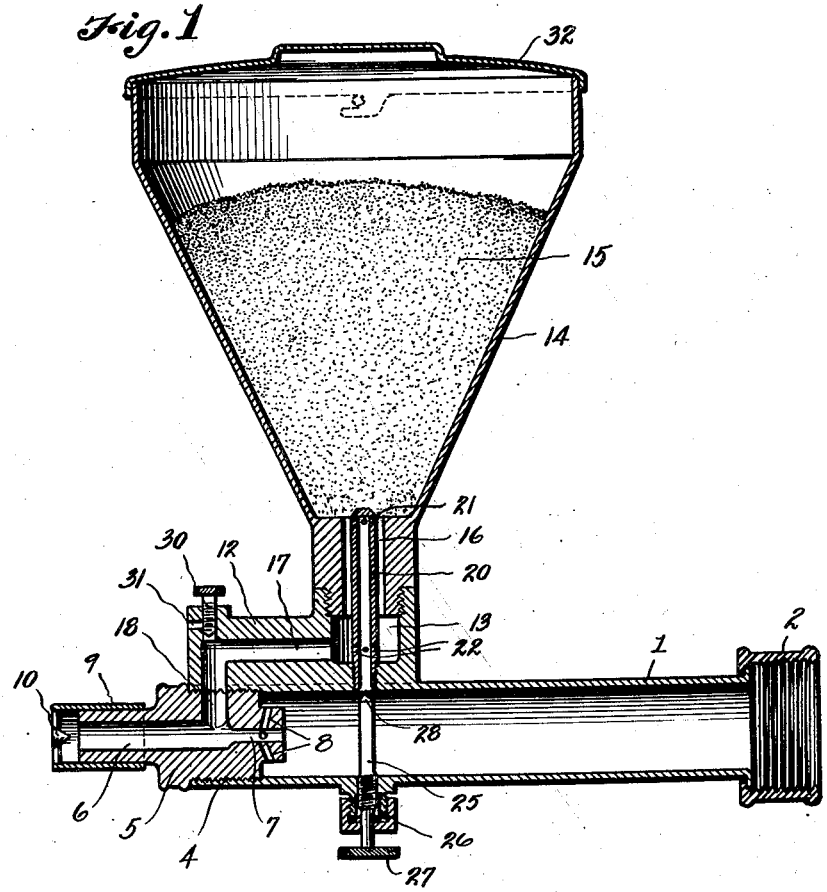
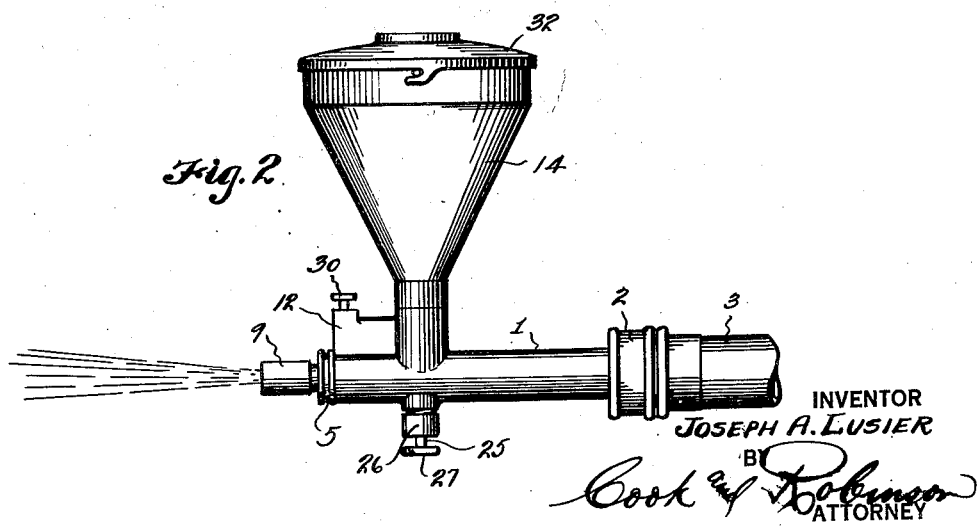
INVENTOR
JOSEPH A. LUSIER
BY
Cook & Robinson
ATTORNEY Patented July 1, 1930

1,769,266

UNITED STATES PATENT OFFICE

JOSEPH A. LUSIER, OF SEATTLE, WASHINGTON

SPRAY DEVICE

Application filed July 11, 1927. Serial No. 204,927.

This invention relates to improvements in spraying devices, and particularly to a spraying attachment for distributing commercial fertilizer; it being the principal object of the present invention to provide a spray device of the above character that is adapted for connection with the ordinary garden hose, and which embodies a container, or hopper, in which a quantity of fertilizer may be placed and from which will be fed automatically into the spray for distribution thereby.

The commercial fertilizer for which the present device is intended is prepared in powdery, or granular, form and the customary method of distributing this is to dissolve a quantity in a certain amount of water and then sprinkle the water over the ground to be fertilized. This method is very unsatisfactory for the reason that an even distribution is impossible and it frequently happens that too much is placed in one spot which causes damage to the vegetation instead of being a benefit. Therefore, it is the object of the present invention to provide means for an easy and even distribution of the fertilizer without requiring that it previously be dissolved.

More specifically stated, the invention resides in the provision of a spraying device for the above purpose embodying a spray nozzle and a hopper for fertilizer, having a feed connection with the nozzle through which the fertilizer will be drawn by suction created in the nozzle and will be fed into the latter and distributed by the spray.

Other objects of the invention reside in the provision of means for controlling the rate of feeding the fertilizer into the spray.

Other objects of the invention reside in the various details of construction, the combination of parts embodied in the invention and in their mode of operation as is hereinafter described.

In accomplishing these and other objects of the invention, I have provided the improved details of construction, the preferred forms of which are illustrated in the accompanying drawings, wherein—

Figure 1 is a central, vertical section of a spraying device constructed in accordance with the present invention.

Figure 2 is a side view of the device as connected with a hose in use.

Referring more in detail to the drawings—

1 designates the tubular body of the spraying device, provided at one end with an interiorly threaded nipple 2 whereby it may be attached, as shown in Figure 2, to a garden hose 3. At its other end, the tube 1 is interiorly threaded, as at 4, and threaded therein is a spray head 5 having a co-axial spray channel 6 which, at its inner end, is fed by a smaller continuing channel 7 that opens directly into the tube 1 and which is also fed by a plurality of small, radially directed channels 8 through which water enters the channel 7 in such manner as to form a whirling spray. Fitted over the outer end of the spray head is a friction tight sleeve 9 supporting centrally at its outer end a conical head 10 against which the water is discharged from the channel 6 to be formed into a spray; the direction of the spray being controlled by adjustment of the sleeve which will move the head 10 from or toward the end of the channel 6.

Formed integrally with the tube 1, at one side, is a boss 12 provided with a laterally opening chamber 13 into which the lower end of a conical hopper 14 for containing commercial fertilizer, as indicated at 15, is threaded. The mounting end of the hopper has a coaxial passage 16 through which the fertilizer may be fed into the chamber 13 and from this it is delivered through a channel 17 in the boss 12 and a continuing channel, or port 18, in the head 5 into the spray channel 6.

Located co-axially of the passage 16 is a small pipe 20 which, at its outer end, is closed and, at its inner end, is threaded through the base of chamber 13 and into the tube 1. The closed end of the pipe 20 terminates approximately even with the upper end of the channel 16 and is provided at that end with a plurality of small, downwardly directed jet openings 21 through which water from the tube 1 may be discharged downwardly through the channel to effect the feeding of the fertilizer to the mixing chamber 13 from which it passes through channels 17 and 18 into the spray channel 6. Additional jets 22 are provided in the tube within the chamber 13 to farther force the flow of the material through the channels and to provide sufficient water for dissolving the fertilizer.

When the device is in use the rate of flow of the fertilizing material from the hopper into the spray is dependent on the amount of water delivered from the jets 21 and 22 and the suction that is created by the passage of the water from the channel 7 and through the channel 6. To control the jets, I have provided the needle 25 which is threaded upwardly through the base of the tube 1 through a suitably packed gland 26, and this is provided at its outer end with a thumb nut 27 whereby it may be adjusted and, at its inner end, it is tapered to a point 28 for adjustment into and from the inner end of the feed pipe 20. The suction through the feed channel is controlled by adjustment of a thumb screw 30 across a port 31 that opens from atmosphere into the channel 17; it being apparent that the more air admitted to the channel the less will be the suction for drawing the material from the mixing chamber 13.

The hopper 14 is provided with a cover 32 and this may be held in place by any suitable connection means.

In using the device, the commercial fertilizer, which is powdered or granular form, is placed in the hopper; then, the water is turned into the hose and is discharged through the tube 1 and spray head channel 6. Water entering the tube 20 from the tube 1 is discharged through small jets 21 and, this feeds the fertilizer downwardly through the channel 16 into the mixing chamber 13 where it is dissolved and mixed with the water supplied through the jets 22, and the solution is then delivered through the channels 17 and 18 to the channel 6 where it is thoroughly mixed with and discharged by the water sprayed from the nozzle. The rate of flow of the fertilizer from the hopper into the nozzle is made faster or slower by adjustment of the needle 25 from or toward the end of the tube 20 to admit more or less water, and by adjustment of the screw 30, to admit more or less air into the channel 17 and thus control the amount of suction for drawing the solution from the chamber 13. If it is desired to feed the maximum amount of the mixture to the nozzle, the screw 30 is turned down to entirely close the port 31 and the needle 25 is adjusted so as to entirely open the entrance to the pipe 20.

While I have described the feeding of the fertilizer by the water feed and suction, it is apparent that the material could be fed by either suction or water alone, or could feed by a natural gravity flow if such was desired. However, the present method is thought to be more accurate in determining the amount of material delivered to the spray.

Devices of this character provide a convenient, practical and economical way of distributing commercial fertilizer without the danger and damage to vegetation by applying too much in any one place. Such devices may be made in various sizes and it is readily apparent that various details of construction could be changed without departing from the spirit of the invention and, for this reason, I do not wish to be limited in the claims only to the specific details herein illustrated.

Having thus described my invention, what I claim as new therein and desire to secure by Letters Patent, is:

1. A nozzle having a spray discharge channel and a mixing chamber provided with an outlet leading into said spray discharge channel, a storage hopper having a feed channel leading into the mixing chamber and means for introducing water into the said feed channel adjacent the base of the hopper and into the mixing chamber.

2. A nozzle having a spray discharge channel and having a mixing chamber; said mixing chamber having an outlet leading into the spray discharge channel, a storage hopper having a feed channel leading into the mixing chamber and a pipe connected with the nozzle and leading into the feed passage and provided with jet openings whereby water from the nozzle will be delivered into the feed passage and into the mixing chamber.

3. A device of the character described, comprising a nozzle adapted for connection with a hose and having a spray head provided with a spray discharge channel, a boss formed at the side of the nozzle having a laterally opening mixing chamber and a channel connecting the mixing chamber with the discharge channel of the spray head, a pipe disposed within the discharge opening of the hopper and extending through the mixing chamber and opening into the nozzle; said pipe having jets for the discharge of water downwardly through the discharge opening of the hopper and to the mixing chamber, means for controlling the admittance of water to the pipe and means for controlling the admittance of air into the channel which connects the mixing chamber with the spray channel.

Signed at Seattle, Washington, this 6th day of July, 1927.

JOSEPH A. LUSIER.